United States Patent [19]

Briggs

[11] 4,426,243

[45] Jan. 17, 1984

[54] ROOM-TEMPERATURE-CURABLE, QUICK-SETTING ACRYLIC/EPOXY ADHESIVES AND METHODS OF BONDING

[75] Inventor: Paul C. Briggs, Danvers, Mass.

[73] Assignee: Illinois Tool Works Inc., Chicago, Ill.

[21] Appl. No.: 326,355

[22] Filed: Dec. 1, 1981

[51] Int. Cl.$^3$ ............................................. C09J 5/02
[52] U.S. Cl. ........................ 156/307.3; 156/310; 156/314; 156/330; 428/414; 428/420; 525/112; 525/408; 525/531; 525/922; 528/112; 528/106
[58] Field of Search ............... 156/310, 314, 293, 330, 156/307.3; 427/302, 340, 333; 428/414, 420; 528/106, 112; 525/408, 531, 112, 922

[56] References Cited

U.S. PATENT DOCUMENTS

| | | | |
|---|---|---|---|
| 2,633,458 | 3/1953 | Shokal | 525/510 |
| 2,768,153 | 10/1956 | Shokal | 260/47 |
| 2,824,851 | 2/1958 | Hall | 525/531 |
| 2,847,395 | 8/1958 | Wear | 156/330 |
| 2,890,202 | 6/1959 | Parker | 525/531 |
| 2,992,193 | 7/1961 | Porret et al. | 260/2 |
| 3,066,112 | 11/1962 | Bowen | 528/112 |
| 3,156,580 | 11/1964 | Howard | 117/25 |
| 3,300,547 | 1/1967 | Gorman | 260/885 |
| 3,377,406 | 4/1968 | Newey et al. | 525/529 |
| 3,591,438 | 7/1971 | Toback | 156/310 |
| 3,616,040 | 10/1971 | Toback | 156/310 |
| 3,684,617 | 8/1972 | Windecker | 156/330 |
| 3,725,504 | 4/1973 | Owston | 260/876 R |
| 3,832,274 | 8/1974 | Owston | 161/183 |
| 3,870,675 | 3/1975 | Kusayama | 274/424 |
| 3,873,640 | 3/1975 | Owston | 260/878 |
| 3,890,407 | 6/1975 | Briggs, Jr. et al. | 260/878 |
| 3,912,773 | 10/1975 | Havriliak | 525/112 |
| 3,940,537 | 2/1976 | Burns | 525/531 |
| 3,994,764 | 11/1976 | Wolinski | 156/218 |
| 3,997,694 | 12/1976 | Wu | 428/35 |
| 4,051,195 | 9/1977 | McWhorter | 528/106 |
| 4,053,680 | 10/1977 | Wasserman et al. | 156/329 |
| 4,055,541 | 10/1977 | Riew | 260/47 |
| 4,126,504 | 11/1978 | Wolinski | 156/310 |
| 4,168,338 | 9/1979 | Kato et al. | 428/414 |
| 4,182,644 | 1/1980 | Briggs, Jr. | 156/310 |
| 4,219,377 | 8/1980 | Albrecht | 156/330 |
| 4,228,062 | 10/1980 | Lee, Jr. | 260/42.28 |
| 4,235,986 | 11/1980 | Catena | 526/320 |
| 4,243,706 | 1/1981 | Williams | 427/386 |
| 4,251,565 | 2/1981 | Bowen | 427/2 |

OTHER PUBLICATIONS

Handbook of Epoxy Resins.

*Primary Examiner*—John J. Gallagher
*Attorney, Agent, or Firm*—Trexler, Bushnell & Wolters, Ltd.

[57] ABSTRACT

A polymerizable mixture for adhesive bonding is disclosed. The polymerizable mixture comprises a polymerizable acrylic-based material, a polymerizable epoxide-based material and a bifunctional molecular material reactable with said acrylic-based material and said epoxide-based material.

26 Claims, No Drawings

ROOM-TEMPERATURE-CURABLE, QUICK-SETTING ACRYLIC/EPOXY ADHESIVES AND METHODS OF BONDING

BACKGROUND OF THE INVENTION

The present invention relates to adhesives. More particularly it relates to novel adhesive compositions which are curable to form strong, durable adhesive bonds and to methods of bonding.

There has been considerable interest in the general field of adhesives for use in the rapid mass production of a wide range of products. However, adhesive bonding, particularly with heretofore known high-strength durable adhesives, has been relatively slow and/or has required special equipment so as to present a substantial impediment to achieving commercially practical production.

Heretofore, acrylic-based adhesives, cured by free radical addition reaction mechanisms, have been suggested for use in applications which require fast curing and flexible adhesive composition. While these acrylic-based adhesives form flexible bonded joints which exhibit beneficial properties in some applications, they often possess unacceptable water-, solvent-, or heat-resistant qualities.

Curable epoxy resins have also been used as adhesive compositions. Unlike the free radical addition curing catalysts which are used with acrylic-based adhesives, the epoxy resins are polymerized by ionic addition mechanisms and often require high curing temperatures and long setting times. While epoxy adhesives form a tight polymer network and are characterized by durability, good adhesion, and good water, chemical, and/or heat-resistant qualities, they tend to be brittle; and long curing time renders such resins inappropriate for many industrial applications.

It is generally recognized in the art that acrylic-based adhesives and epoxy resin-based adhesives are mutually non-reactive together. For example, in the 3,684,617 patent the inventor deals with an adhesive mixture of acrylic-based monomer and epoxy resin, each of which requires its own curing agent resulting in separate curings without interbonding. Moreover, other composite mixtures have been suggested wherein the epoxy resin component of a composite adhesive mixture generally does not react at all. For example, the U.S. Pat. No. 3,994,764 deals with such a non-reactive composite adhesive. The '764 patent suggests a number of ingredients, one of which is an epoxy resin, selectively added to an acrylic-based adhesive. However, the '764 patent specifically teaches away from an interaction of the epoxy resin component.

An object of the present invention is to rovide a novel, quick-setting, room-temperature-curable adhesive, which combines the room temperature curing and quick setting features of the acrylic-based adhesives with the strong bonding qualities of the epoxy resin-based adhesives.

A further object of the present invention is to provide a novel, economical method of bonding workpieces together in a manner permitting relatively rapid production while providing a strong, durable bond.

The present invention takes two different adhesive components, one of which is an acrylic-based adhesive the other of which is an epoxy resin, which by their very nature are not expected to be reactive together, and chemically bonds them together. Each of these adhesive components has a unique set of properties, and the present invention combines those properties in the reaction wherein the composite adhesive is allowed to "cure".

As used herein, a "difunctional" molecule will refer to a molecule which has two chemically reactive groups of the same chemical functionality attached. For example, an ethoxylated bisphenol A dimethacrylate molecule has two methacrylate functional groups attached. Another example is the bisphenol A diepoxide molecule which has two epoxide functional groups attached. In this sense, trimethylolpropane [2-ethyl-2-(hydroxymethyl)-1, 3-propanediol] trimethacrylate is an example of a "trifunctional" molecule because it has three methacrylate functional groups attached, and tetramethylolpropane tetramethacrylate is an example of a "tetrafunctional" molecule because it has four methacrylate functional group attached. As used herein, a "bifunctional" molecule will refer to a molecule which has two chemically reactive functional groups of different chemical functionality attached. For example, methacrylic acid has an acrylic-based chemically reactive group and an epoxide-reactive group, attached to the same molecule. For purposes of illustrating the present invention, bifunctional molecules disclosed include molecules having two functional groups attached, wherein one functional group is epoxide-group chemically reactive and another functional group is acrylic-based chemically reactive.

It is known in the art that acrylic-based adhesives usually require the presence of a catalyst of the free radical type. It is also known in the art that suitable catalysts include the organic peroxides, organic hydroperoxides, and organic peresters, which can be exemplified respectively by benzoyl peroxide, cumene hydroperoxide, and acetyl peroxide. It is known in the art that acrylic-based materials generally contain inhibitors. It is also known in the art, that other materials can also be added to the acrylic-based adhesive composition to affect the speed of the reaction of the adhesive composition. For example, it is known that certain substances, acting as inhibitors, will interfere with the catalyst in such a way as to substantially reduce the rate of polymerization, and that certain metal salts, functioning as initiators or activators, can be added to accelerate the rate of polymerization.

As used herein, the "adhesion reaction" as illustrated in the following example wherein workpieces are bonded together comprises two steps: initial "set up", which is usually quick and often takes no more than a few minutes, and final "cure", which is the polymerization reaction between the acrylic-based and epoxide-based components of the adhesive. The "quick set" feature of the present invention is obtained during this initial set up; and the term "quick set" as herein used means that workpieces are substantially adhesively bonded together by the adhesive mixture of the present invention within a short period of time which may, for example, be in the neighborhood of ten minutes or less. The bond provided by the "quick set" is sufficient to permit some further handling of the assembled workpieces such as may be necessary for removal from an initial assembly and bonding-station or -apparatus prior to a final cure of the adhesive, thereby promoting faster and more economical production.

SUMMARY OF THE INVENTION

In accordance with the present invention, an acrylic-based adhesive is mixed with and chemically bonded to the epoxide portion of an epoxy resin adhesive. More specifically, it has been found that certain bifunctional molecular materials can be used to bond a polymerizable acrylic-based adhesive to the epoxide group of a polymerizable epoxy resin. For example, methacrylic acid is a bifunctional molecular material usable in the present invention. It has been found that such adhesive mixtures of the present invention are "quick setting" and subsequently cure to provide good, strong adhesive bonds relatively quickly at room temperature curing conditions and that such adhesive mixtures provide even better bonds at elevated temperatures.

During the course of the development of the present invention, it was observed that the method of initiating the adhesion reaction was important to meet certain of the objects of the present invention. Certain aldehyde amine reaction products, acting as catalyst or co-catalyst initiators, have proved important in obtaining the desired adhesive qualities.

In accordance with a bonding method incorporating features of the present invention, a quantity of adhesive components, except for the activating or initiating ingredient, is prepared and applied to a surface of one workpiece. A quantity of the activating or initiating material is applied to the surface of a mating workpiece and the workpieces are then brought together. In accordance with a second bonding method of the present invention, a first workpiece has a quantity of the activating or initiating material applied to a surface, the activator- or initiator-bearing surface of the first workpiece is then brought into close proximity to a surface of a second workpiece thereby providing a gap between the two workpieces, and a quantity of adhesive components, except for the activating or initiating ingredient, is prepared and added to the gap. In accordance with a third bonding method of the present invention, a first workpiece having a surface defining a cavity has a quantity of the adhesive components, except for the activating or initiating ingredient, prepared and added to the cavity. A second workpiece having a quantity of the activating or initiating material applied to a surface thereof is inserted into the cavity in a fashion such that adhesive-component-covered and initiator-bearing surfaces of the respective workpieces are positioned in close proximity. Examples of mechanical addition mechanisms for adding these adhesive components: such as by injecting, pumping or drawing into the gap or cavity; or mechanisms employing natural forces: such as gravity or capillary action, are herein mentioned to illustrate bonding methods of the present invention. Mention of these examples is in no way intended to limit bonding method scope.

When the initiator or accelerator is thus separately applied, the adhesive may be termed a "no mix" composition. The accelerator functionss as a "surface activator". The surface activator used herein is a substance which is used to trigger the action of the catalyst and initiate the quick set. After the workpieces are brought into close proximity such as to permit intimate contacting of their respective surfaces with the adhesive of the present invention, the adhesive initiates a quick set up, generally at room temperature. Thereafter, the adhesive is caused to "cure". Clearly, since the initiator or activator is used to trigger the action of the catalyst, a quantity of adhesive components including activating or inhibiting ingredients, but not a catalytic ingredient, can be prepared and applied to a surface of one workpiece and a small amount of a catalytic substance can be applied to a surface of another workpiece in any of the bonding methods mentioned above.

Moreover, interchangeability of an activator and a catalyst (as above discussed) is well known in the art. See, for example, the U.S. Pat. No. 4,126,504 to Wolinski et al at column 5, lines 7-13 and 62-65 in connection with column 6, lines 40-43.

The workpieces may be assembled or brought together by many different means, such as through the use of rollers or clamping devices or fixtures. It is contemplated that the workpieces may be held by such devices during all or a portion of the quick set period and then removed for final curing. The curing portion of the adhesion reaction may take place at room temperature or it may be done at elevated temperatures.

As used herein, the term "acrylic-based" adhesive component is used generically and generally refers to the following chemical structure:

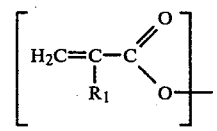

where $R_1$ can be hydrogen, a methyl group or an ethyl group. When the above chemical structure is bonded to hydrogen, and when the $R_1$ is also hydrogen, the adhesive component is known as acrylic acid (an organic acid). When the above chemical structure is bonded to a methyl group and when $R_1$ is also a methyl group, the adhesive component is known as methyl methacrylate (an ester). It is known in the art, that polymerization of either of the above mentioned structural examples proceeds by a free radical addition polymerization mechanism, principally because of the chemical interaction between the free radical substance and the carbon-carbon double bond.

As used herein "epoxy resins" are compounds containing the three-member "epoxide" group (or ring), as shown below, as an integral part of the chemical structure.

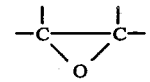

In the above structure, the individual carbon atoms can be bonded to hydrogen, but generally they are bonded to organic chemical backbones much more complex. For example, the backbone can be an aliphatic organic molecule, a cyclic organic molecule, an aromatic organic molecule, or any combination of these. It is known in the art, that epoxide groups react via ionic addition mechanisms.

Although many of the examples of the present invention use bisphenol A (also known as 4,4'-Isopropylidenediphenol) as the chemical backbone of the difunctional molecule, a variety of other suitable chemical structures can be used as the backbone of the difunctional molecule. The chemical structure of the bisphenol A is shown below

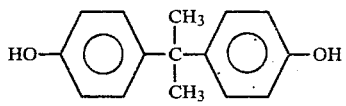

A typical diepoxide adhesive component used in the present invention is diglycidyl ether of bisphenol A; and a typical diacrylic-based adhesive component used is ethoxylated bisphenol A dimethacrylate. As is known by those skilled in the art, these two examples of difunctional molecules are structurally similar but chemically very different.

The components of an example of a "no mix" form of the present invention are shown below (in Table 1). Compounds 1-7 are mixed together, using conventional mixing techniques, to make a storage-stable liquid mixture. (The current shelf life of the liquid mixture is somewhere between six months and one year.) Then, to make an adhesive bond, component 8, here used as a surface activator, is applied to one of the workpieces, and the mixture (comprising components 1-7), is applied to the other workpiece. When the two workpieces are brought together into close proximity such that the surface activator makes intimate contact with the liquid mixture, the adhesion reaction begins. In this no-mix composition, components 1 and 2 are difunctional molecular materials, components 3 and 4 are bifunctional molecular materials, component 5 is a crosslinker, components 6 and 7 are the catalysts, and component 8 is the surface activator. Component 3 is a bifunctional molecular material, because it has an acrylic-based portion and an epoxide-based portion. Component 4 is a bifunctional molecular material becuase it has an acrylic-based portion and an acidic portion which reacts with an epoxide ring. Component 5 is optional and may be added because it gives enhanced heat resistance to the adhesive. Functioning as a crosslinking agent, component 5 takes the partially polymerized short-chain strands of dimethacrylate polymer and connects them in a linking and cross-linking manner. Component 6 is added for purposes of initiating polymerization of the acrylic-based adhesive component.

TABLE 1

Components of a "no mix" composition

| Compound | Component Number | Type | Parts, By Weight |
|---|---|---|---|
| Ethoxylated Bisphenol A Dimethacrylate[1] | (1) | di-methacrylate | 35 |
| Bisphenol A/ Epichlorohydrin Resin | (2) | diepoxide | 35 |
| Glycidyl methacrylate[2] | (3) | bifunctional | 10 |
| Methacrylic acid[3] | (4) | bifunctional | 15 |
| Trimethylolpropane trimethacrylate | (5) | crosslinker | 5 |
| Cumene hydroperoxide | (6) | peroxide catalyst | 1 |
| Diphenyl ether disulfonyl chloride | (7) | Co-catalyst | Appx 0.2-0.5 |
| Amine - aldehyde Condensation product, Copper modified | (8) | Surface activator | to cover bonding surface |

[1]Containing approximately 350 parts per million (ppm) of p-methoxyphenol as an inhibitor.
[2]Containing approximately 50 ppm of p-methoxyphenol as an inhibitor.
[3]Containing approximately 250 ppm of p-methoxyphenol as an inhibitor.

In the above "no mix" adhesive composition the methacrylate-based adhesive component provides the composite adhesive of the present invention with a quick, room-temperature set and causes partial bond strength. Upon heating, or through passage of time, the epoxide groups react with additional components in the adhesive composition to cure fully and develop full adhesive strength.

The composite adhesive of the present invention can be classified as a polymerizable mixture for adhesive bonding comprising (1) an acrylic-based adhesive component; (2) an epoxide-based adhesive component; (3) a bifunctional molecular material comprising epoxide-reactive and acrylic-based reactive functional groups; (4) various catalysts; (5) an activator; and (6) an optional crosslinking agent. The present invention combines the desirable features of acrylic-based adhesives which are fast-setting, room-temperature-curing, no-mix compounds, with those of epoxide-based adhesives which are heat- and solvent-resistant and durable.

The following (Example 1) illustrates the heat durability of the adhesive bond of the composite adhesive of the present invention within the 3:4 to 4.5:2.5 weight range of diepoxide: dimethacrylate. Four different formulations (referred to as Test Nos. 1-4) were made up and tested. For each formulation, unless otherwise indicated, the numbers referred to are parts by weight. These tests were conducted on steel which had been solvent cleaned. One of the steel mating surfaces had a thin film of the activator, "Vanax 808" applied to it. Vanax 808 functions as an accelerator or initiator, is a mixture of butyraldehydeaniline condensation products, and can be purchased from R. T. Vanderbilt and Company, Incorporated. The adhesive was allowed to cure at room temperature. The adhesive bond was then subjected to a high temperature environment. Then a "lap shear test" (ASTM D-1002-72) was performed, testing the adhesive bonds.

EXAMPLE 1

| | | Formulation Test Number | | | |
|---|---|---|---|---|---|
| Compounds | | 1 | 2 | 3 | 4 |
| Bisphenol A/Epichlorohydrin Resin | | 3.5 | 3.0 | 4.0 | 4.5 |
| Ethoxylated Bisphenol A Dimethacrylate | | 3.5 | 4.0 | 3.0 | 2.5 |
| Glycidyl methacrylate | | 1 | 1 | 1 | 1 |
| Trimethylolpropane trimethacrylate | | — | .5 | .5 | .5 |
| Methacrylic acid | | 1.5 | 1.5 | 1.5 | 1.5 |
| Cumene Hydroperoxide | | 2 drops | 2 drops | 2 drops | 2 drops |
| Diphenyl ether disulfonyl chloride | | trace | trace | trace | trace |
| Lap Shear test results, psi | | | | | |
| Cure was 5 hours at room temperature; then, bond was held at 300° F. for 3 days | Shear test performed at 300° F. | 1400 | 1300 | 1200 | 1120 |
| | Shear test performed at room temperature | 1700 | 1660 | 1600 | 2000 |
| Cure was 4 days at room temperature | Then, bond was held at 400° F. for 1 day and tested at room temp. | 1060 | 1320 | 1720 | 1360 |
| | Then, bond was held at 400° F. for 3 days and tested at room temp. | 1160 | 1120 | 1120 | 600 |

The following example (Example 2) compares the high temperature durability and high temperature chemical resistance of adhesive bonds formed using a conventional acrylic adhesive, a conventional epoxy adhesive and the composite adhesive of the present invention. Using the following formulations*, the adhesives were allowed to set up at room temperature. As used herein, room temperature is defined to be approximately 25° C. (77° F.). The adhesives were then oven cured 2 hours at 70° C. (158° F.), followed by one hour at 177° C. (351° F.). Cold rolled steel panels were the workpieces.

*Formulations of the respective adhesives[a] tested
Ingredient Make Up, Parts by Weight

| Ingredients Used | Conventional Acrylic Adhesive | Composite Adhesive of the Present Invention |
|---|---|---|
| Bisphenol A/Epichlorohydrin Resin | — | 37 |
| Ethoxylated Bisphenol A Dimethacrylate | 74 | 37 |
| Glycidyl Methacrylate | 10 | 10 |
| Methacrylic Acid | 15 | 15 |
| Cumene Hydroperoxide | 1 | 0.5 |
| Diphenyl ether disulfonyl chloride | 0.2 | 0.1 |

[a]The conventional epoxy adhesive is 100 parts (by weight) of bisphenol A epichlorohydrin resin and 2 parts of 2-ethyl-4-methyl imidazole.

EXAMPLE 2

Comparisons of high temperature durability

| Lap shear, test results, psi | Test numbers and respective results of (conventional acrylic adhesive/conventional epoxy adhesive/composite adhesive of the present invention) bonds formed | | |
|---|---|---|---|
| | 5 | 6 | 7 |
| Heated for 1 hour at 233° C. (450° F.). Adhesion at elevated temperature. | 140/720/195 | — | — |
| Aged for 1 week at 232° C. (450° F.). Adhesion at room temperature. | — | 200/1680/400 | — |
| Aged for 2 weeks at 232° C. (450° F.). Adhesion at room temperature | — | — | None survived/1467/500 |

Comparisons of high temperature chemical resistance

| Lap shear test results, psi | | Test numbers and respective results of (conventional acrylic adhesive/conventional epoxy adhesive/composite adhesive of the present invention) bonds formed | | | | | | |
|---|---|---|---|---|---|---|---|---|
| | | 8 | 9 | 10 | 11 | 12 | 13 | 14 |
| Aged one month at 87° C. (188.6° F.) in | Anti-freeze/water (50/50) | 245/715/1000 | — | — | — | — | — | — |
| | Water | — | 325/300/430 | — | — | — | — | — |
| | Transmission oil | — | — | 437/1270/1617 | — | — | — | — |
| | SAE 30 Oil | — | — | — | 393/1297/1560 | — | — | — |
| | 10% NaOH | — | — | — | — | —/660/220 | — | — |
| Aged one month at room temperature in | Methyl Ethyl Ketone | — | — | — | — | — | 160/1340/1015 | — |
| | (Control) | — | — | — | — | — | — | 480/1360/1060 |

The following example (Example 3) illustrates the effectiveness of the composite adhesive of the present invention in providing an adhesive possessing high lap shear strength and high peel strength (test results obtained performing ASTM D-1876-61T), while at the same time, quickly bonding together the workpieces because of the quick set and rapid cure rate. In the following example, the ABS (acrylonitrile butadiene styrene) resin was added to the mixture to make the adhesive more viscous and the cured bond more flexible. Increased viscosity often enhances the quick set feature of an adhesive. An aliphatic amine adduct, a known curing agent for epoxies, was included in the mixture. A butylated hydroxytoluene (BHT) antioxidant ingredient, a known stabilizer, has been added to the mixture to counteract the effect of the hydroperoxide ingredient and give the adhesive mixture a longer shelf life. The aliphatic amine adduct, an optional ingredient, is also known to retard the cure under certain conditions. A synthetic spermaceti wax, another optional ingredient, tends to migrate to the surface of the adhesive mixture, and thereby prevents the volatile components from evaporating, if such is desired. The components were mixed in the weight proportions indicated. The adhesive was then applied to etched aluminum strips for adhesive testing.

EXAMPLE 3

|  | Test Numbers | | |
|---|---|---|---|
|  | 15 | 16 | 17 |
| ABS resin | 2.718 | 1.510 | 0.3020 |
| Methyl methacrylate | 5.652 | 3.140 | 0.6280 |
| Methacrylic acid | 0.432 | 0.240 | 0.0480 |
| Bisphenol A/Epichlorohydrin Resin | 1.000 | 5.000 | 9.0000 |
| Aliphatic amine adduct | 0.200 | 1.000 | 1.8000 |
| Cumene Hydroperoxide | 0.0432 | 0.024 | 0.0048 |
| Diphenylether 1, 1-disulfonyl chloride | 0.0261 | 0.0145 | 0.0029 |
| BHT antioxidant | 0.0216 | 0.0120 | 0.0024 |
| Synthetic spermaceti wax | 0.0873 | 0.0485 | 0.0097 |
| Vanax 808 | 0.1000 | 0.0400 | 0.0100 |

| Lap shear test results, psi | Test numbers | 15 | 16 | 17 |
|---|---|---|---|---|
| Cured at elevated temperatures for | 30 minutes | n.t. | 200 | n.t. |
| | 24 hours | 1490 | 2465 | 1975 |

| Peel strength test results, pli | Test Numbers | 15 | 16 | 17 |
|---|---|---|---|---|
| Cured for: | 2 days at room temperature | 18 | 16 | 10 |
| | 2 hours at 65° C. | 0 | 19 | 0 |

In addition to the specific bonding examples presented above, the composite adhesive of the present invention can be used in many commercial or industrial applications. For example, the adhesive of the present invention can be used to bond a steel motor magnet to an aluminum housing; and it can be used to adhesively bond a variety of plastic workpieces togehter. In the construction area, the present invention can be used to adhesively bond re-inforcing members, thereby eliminating the need to use conventional welding or other fastening techniques. In addition, the composite adhesive of the present invention can be used to bond surfaces which are not necessarily clean. These general examples are by no way intended to limit the scope or potential utility of the present invention.

The invention is claimed as follows:

1. A method of obtaining a quick-setting, strong, durable, heat-resistant and solvent-resistant adhesive bond between two surfaces, comprising: applying to one of said surfaces a polymerizable mixture comprising a polymerizable acrylic-based ester material, a polymerizable epoxide-based material, a bifunctional molecular material reactable with said acrylic-based material and said epoxide-based material, and a catalyst; causing an activator to be applied to the other one of said surfaces; and bringing said surfaces together with said mixture and said activator therebetween, said epoxide-based material being in an effective amount for promoting said strong, durable, heat-resistant and solvent-resistant adhesive bond, the ester material amount being relatively greater by weight than the bifunctional material amount, said ester and bifunctional molecular material amounts being effective for causing said adhesive bond to cure at room temperature, said mixture polymerizing and said adhesive bond curing at said room temperature.

2. A method of obtaining a quick-setting, strong, durable, heat-resistant and solvent resistant adhesive bond between two surfaces, comprising: applying an activator to one of said surfaces; bringing said surfaces into such close proximity as to provide a gap between said surfaces, said activator being within said gap; adding into said gap a polymerizable mixture comprising a polymerizable acrylic-based ester material, a polymerizable epoxide-based material, a bifunctional molecular material reactable with said acrylic-based material and said epoxide-based material, and a catalyst; and causing contact of said activator by said polymerizable mixture, said epoxide-based material being in an effective amount for promoting said strong, durable, heat-resistant and solvent-resistant adhesive bond, the ester material amount being relatively greater by weight than the bifunctional material amount, said ester and bifunctional material amounts being effective for causing said adhesive bond to cure at room temperature, said mixture polymerizing and said adhesive bond curing at said room temperature.

3. The method of claim 1 or claim 2 wherein said polymerizable mixture further includes a crosslinking ingredient.

4. The method of claim 3 wherein said polymerizable acrylic-based material is selected from the group consisting of methyl methacrylate and ethoxylated bisphenol A dimethacrylate.

5. The method of claim 4 wherein said polymerizable epoxide-based material is diglycidyl ether of bisphenol A.

6. The method of claim 5 wherein said bifunctional molecular material is selected from the group consisting of glycidyl methacrylate and methacrylic acid.

7. The method of claim 6 wherein said crosslinking ingredient is trimethylolpropane trimethacrylate.

8. A method of obtaining a quick-setting, strong, durable, heat-resistant and solvent-resistant adhesive bond between at least two surfaces, comprising: applying to one of said surfaces a polymerizable mixture comprising a polymerizable acrylic-based ester material, a polymerizable epoxide-based material, a catalyst, and bifunctional molecules reactable with both of said materials; applying to said mixture an effective amount of an activator for obtaining quick setting of said mixture; and bringing said surfaces into contact with said mixture, whereby to effect a quick-setting, strong, durable, heat-resistant and solvent-resistant adhesive bonding of said surfaces together, said epoxide-based material being in an effective amount for promoting said strong, durable, heat-resistant and solvent-resistant adhesive bond, the ester material amount being relatively greater by weight than the bifunctional molecules amount, said ester and bifunctional material amounts being effective for causing said adhesive bond to cure at room temperature, said mixture polymerizing and said adhesive bond curing at said room temperature.

9. A method of obtaining a quick-setting, strong, durable, heat-resistant and solvent-resistant adhesive bond between at least two surfaces, comprising: applying to one of said surfaces a polymerizable mixture comprising a polymerizable acrylic-based ester material, a polymerizable epoxide-based material, an activator, and bifunctional molecules reactable with both of said materials; applying to said mixture an effective amount of a catalyst for obtaining quick setting of said mixture; and bringing said surfaces into contact with said mixture, whereby to effect a quick-setting, strong, durable, heat-resistant and solvent-resistant adhesive bonding of said surfaces together, said epoxide-based material being in an effective amount for promoting said strong, durable, heat-resistant and solvent-resistant adhesive bond, the ester material amount being relatively greater by weight than the bifunctional molecules amount, said ester material and bifunctional molecules amounts being effective for causing said adhesive bond to cure at room temperature, said mixture polymerizing and said adhesive bond curing at said room temperature.

10. A method of obtaining a quick-setting, strong, durable, heat-resistant and solvent-resistant adhesive bond between at least two surfaces, comprising: applying to one of said surfaces a catalyst; applying to said catalyst an effective amount of a polymerizable mixture comprising a polymerizable acrylic-based ester material, a polymerizable epoxide-based material, an activator, and bifunctional molecules reactable with both of said materials for obtaining quick setting of said mixture; and bringing said surfaces into contact with said mixture, whereby to effect a quick-setting, strong, durable, heat-resistant and solvent-resistant adhesive bonding of said surfaces together, said epoxide-based material being in an effective amount for promoting said strong, durable, heat-resistant and solvent-resistant adhesive bond, the ester material amount being relatively greater by weight than the bifunctional molecules amount, said ester material and bifunctional molecules amounts being effective for causing said adhesive bond to cure at room temperature, said mixture polymerizing and said adhesive bond curing at said room temperature.

11. A method of obtaining a quick-setting, strong, durable, heat-resistant and solvent-resistant adhesive bond between at least two surfaces, comprising: preparing a polymerizable mixture in at least two different portions, a catalyst being in at least one of said portions, an activator being in the other one of said portions, said mixture comprising a polymerizable acrylic-based ester material, a polymerizable epoxide-based material, said catalyst, said activator, and a bifunctional molecular substance reactable with both of said materials, the ester material amount being relatively greater by weight than the bifunctional substance amount, said epoxide-based material being present in said polymerizable mixture in excess of about 9.7% by weight thereof for promoting said strong, durable, heat-resistant and solvent-resistant adhesive bond, said ester material and bifunctional substance amounts being effective for polymerizing said mixture and for curing said adhesive bond at room temperature; applying at least one of said portions to one of said surfaces; applying the other one of said portions to the other one of said surfaces; and causing said surfaces to which said portions have been applied to be brought into close proximity in a manner such that intimate contacting together of both of said portions is made, whereby to effect a quick-setting, strong, durable, heat-resistant and solvent-resistant adhesive bonding of said surfaces together, said mixture polymerizing and said adhesive bond curing at said room temperature.

12. A method of obtaining a quick-setting, strong, durable, heat-resistant and solvent-resistant adhesive bond between at least two surfaces, comprising: applying to one of said surfaces an activator; applying to said activator an effective amount of a polymerizable mixture comprising a polymerizable epoxide-based material; a catalyst; a first amount of a polymerizable acrylic-based ester material and a second amount of bifunctional molecules reactable with both of said materials, the ester material amount being relatively greater by weight than the bifunctional molecules amount, said epoxide-based material being present in said polymerizable mixture in excess of about 9.7% by weight thereof for promoting said strong, durable, heat-resistant and solvent-resistant adhesive bond, said ester material and bifunctional molecules amounts being effective for polymerizing said mixture and for curing said adhesive bond at room temperature, for obtaining quick setting of said mixture; and bringing said surfaces into contact with said mixture, whereby to effect a quick-setting, strong, durable, heat-resistant and solvent-resistant adhesive bonding of said surfaces together, said mixture polymerizing and said adhesive bond curing at said room temperature.

13. A method as defined in claim 8 or claim 9 or claim 10 or claim 12 comprising further curing said mixture at a temperature which is elevated relative to said room temperature.

14. A polymerizable adhesive mixture for obtaining a high-strength, heat-, chemical- and solvent-resistant bond which rapidly polymerizes, cures and sets at room temperature, comprising: a polymerizable epoxide-based material; a catalyst; an activator; a first amount of a polymerizable acrylic-based ester material and a second amount of a bifunctional molecular material chemically reactable with said acrylic-based material and said epoxide-based material, said epoxide-based material being in an effective amount for promoting said high-strength, heat-, chemical- and solvent-resistant bond, the ester material amount being relatively greater by weight than the bifunctional material amount, said ester and bifunctional material amounts being effective for causing rapid polymerizing and curing of said mixture at room temperature.

15. The mixture of claim 14 wherein said polymerizable acrylic-based material is selected from the group consisting of methyl methacrylate and ethoxylated bisphenol A dimethacrylate.

16. The mixture of claim 14 wherein said polymerizable epoxide-based material is diglycidyl ether of bisphenol A.

17. The mixture of claim 14 wherein said bifunctional molecular material is selected from the group consisting of glycidyl methacrylate and methacrylic acid.

18. The mixture of claim 14 including a crosslinking ingredient.

19. The mixture of claim 18 wherein said crosslinking ingredient is trimethylolpropane trimethacrylate.

20. A polymerizable adhesive comprising: a ratioed mixture including between about 3:4 to about 4.5:2.5 by weight of a polymerizable acrylic-based ester material to a polymerizable epoxide-based material; a catalyzable bifunctional material reactable with said acrylic-based ester and epoxide-based materials, the ester material amount being relatively greater by weight than the bifunctional material amount, said epoxide-based material being present in said polymerizable adhesive in excess of about 9.7% by weight thereof, said ester and bifunctional material amounts being effective for polymerizing and curing said adhesive at room temperature; an effective amount of an activatable catalyst for accomplishing catalyzation of said bifunctional material; and an effective amount of an activator for activating said catalyst and for causing interbonding between said acrylic-based ester and epoxide-based materials, said adhesive polymerizing and curing at said room temperature.

21. A polymerizable composition for adhesive bonding comprising: a mixture including a polymerizable acrylic-based ester material, a polymerizable epoxide-based material, and a bifunctional molecular material reactable at room temperature with said acrylic-based material and with said epoxide-based material, said ester material being relatively greater in amount by weight than the bifunctional material amount, said epoxide-based material being present in said composition in excess of about 9.7% by weight thereof for promoting said strong, durable, heat-resistant and solvent-resistant adhesive bond, said ester and bifunctional material amounts being effective for causing said composition to polymerize and harden at room temperature; a catalyst; and an activator, said composition polymerizing and hardening at said room temperature.

22. The composition of claim 21 wherein said polymerizable acrylic-based material is selected from the group consisting of methyl methacrylate and ethoxylated bisphenol A dimethacrylate.

23. The composition of claim 22 wherein said polymerizable epoxide-based material is diglycidyl ether of bisphenol A.

24. The composition of claim 23 wherein said bifunctional molecular material is selected from the group consisting of glycidyl methacrylate and methacrylic acid.

25. The composition of claim 24 including a crosslinking ingredient.

26. The composition of claim 25 wherein said crosslinking ingredient is trimethylolpropane trimethacrylate.

* * * * *